United States Patent
Kumar et al.

(10) Patent No.: US 9,172,796 B2
(45) Date of Patent: Oct. 27, 2015

(54) LOCATION BASED MIXER PRIORITIES IN CONFERENCES

(75) Inventors: Rajneesh Kumar, San Jose, CA (US); Sravan Vadlakonda, Sunnyvale, CA (US); Ashish Chotai, Santa Clara, CA (US); Aseem Asthana, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 2397 days.

(21) Appl. No.: 11/685,771

(22) Filed: Mar. 14, 2007

(65) Prior Publication Data
US 2008/0226049 A1 Sep. 18, 2008

(51) Int. Cl.
*H04L 12/16* (2006.01)
*H04M 3/42* (2006.01)
*H04M 3/56* (2006.01)

(52) U.S. Cl.
CPC .......... *H04M 3/42187* (2013.01); *H04M 3/568* (2013.01); *H04M 3/42374* (2013.01); *H04M 2242/30* (2013.01)

(58) Field of Classification Search
CPC ..... H04M 3/567; H04M 3/562; H04M 3/566; H04M 3/568; H04M 2242/22; H04W 4/02
USPC .................. 370/260; 705/8; 455/456.1, 90.2; 709/204; 379/265.13, 266.01, 202.01; 375/240.28; 348/14.08
See application file for complete search history.

(56) References Cited

U.S. PATENT DOCUMENTS

| | | | | |
|---|---|---|---|---|
| 6,418,169 | B1 * | 7/2002 | Datari | 375/240.28 |
| 6,687,234 | B1 * | 2/2004 | Shaffer et al. | 370/260 |
| 7,580,375 | B1 * | 8/2009 | Friedrich et al. | 370/260 |
| 2003/0149724 | A1 * | 8/2003 | Chang | 709/204 |
| 2004/0057570 | A1 * | 3/2004 | Power et al. | 379/265.13 |
| 2005/0027581 | A1 * | 2/2005 | Kjesbu et al. | 705/8 |
| 2005/0099492 | A1 * | 5/2005 | Orr | 348/14.08 |
| 2005/0213725 | A1 | 9/2005 | Rodman | |
| 2005/0213732 | A1 | 9/2005 | Rodman | |
| 2008/0037763 | A1 * | 2/2008 | Shaffer et al. | 379/266.01 |
| 2008/0176578 | A1 * | 7/2008 | Boss et al. | 455/456.1 |
| 2009/0051756 | A1 * | 2/2009 | Trachtenberg et al. | 348/14.08 |
| 2009/0215411 | A1 * | 8/2009 | Tucker et al. | 455/90.2 |
| 2010/0020954 | A1 * | 1/2010 | Gilg et al. | 379/202.01 |

* cited by examiner

*Primary Examiner* — Dang Ton
*Assistant Examiner* — Lionel Preval
(74) *Attorney, Agent, or Firm* — P. Su (57) ABSTRACT

In one embodiment, a method includes identifying a plurality of locations associated with a conference system that has a conference server and a mixer, and prioritizing the locations by assigning a first priority to at least a first location and assigning a second priority to a second location. The second priority is lower than the first priority. The method also includes processing received media streams such that media streams received from endpoints associated with the first location are processed as having a higher priority than media streams received from endpoints associated with the second location.

7 Claims, 7 Drawing Sheets

LOCATION BASED MIXER PRIORITIES IN CONFERENCES

BACKGROUND OF THE INVENTION

Conference systems typically include mixers that mix and distribute media streams received from one or more active speakers participating in a conference. To mix and distribute media streams, mixers generally determine mixing priorities associated with the various speakers and, hence, streams that originate from the speakers. The energy level of the streams or media streams may be used to determine mixing priorities. By way of example, media streams associated with the loudest speakers and, hence, the highest energy levels, may be mixed at a higher priority than media streams associated with quieter speakers when the number of media streams that may be mixed is limited. Alternatively, the hierarchical ranking of the active speakers participating in a conference may be used to determine a mixing priority, e.g., a conference involving military participants in the field may prioritize media streams received from officers for mixing over media streams received from enlisted men.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes identifying a plurality of locations associated with a conference system that has a conference server and a mixer, and prioritizing the locations by assigning a first priority to at least a first location and assigning a second priority to a second location. The second priority is lower than the first priority. The method also includes processing received media streams such that media streams received from endpoints associated with the first location are processed as having a higher priority than media streams received from endpoints associated with the second location.

Description

In a conference system, the ability to prioritize streams, e.g., media streams, received from one zone or location over streams received from another facilitates communications in situations such as emergency situations. When priority is given to data streams associated with a given location such as the location of a disaster, critical information relating to the disaster is more likely to be received and distributed. By way of example, prioritizing signals that originate from a location of a disaster or an accident effectively ensures that that information originating from the location of the disaster is received and efficiently distributed. In one embodiment, a higher priority may be assigned to a disaster location to prioritize the selection of a current speaker, or to enable mixing of more than one speaker at the scene of the disaster into an output stream. That is, the priority of speakers at the location of a disaster may effectively be bumped or boosted to a higher priority than the priority of speakers at other, less critical locations. It should be appreciated that the boosting of priorities may be temporary in that that the priorities associated with the location of a disaster may be boosted substantially only until the disaster is effectively over.

A command center may define a priority area, e.g., a zone or a location, such that streams or signals received from endpoints in the priority area are mixed with a high priority by a conference server. In defining a priority area, the command center may notify the conference server that streams or signals which originate from the priority area are to be processed with a relatively high priority.

Figure 1:
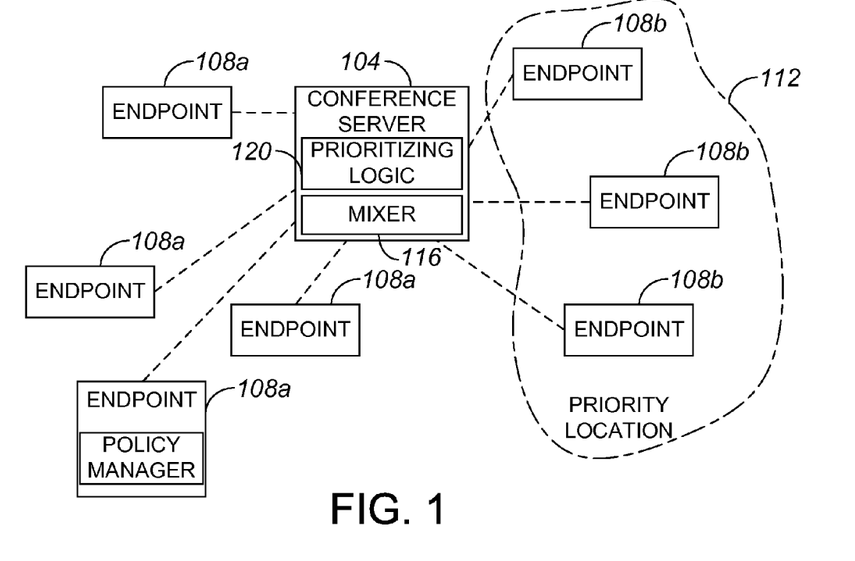
FIG. 1 illustrates an example conference system which utilizes priorities based on locations to mix media streams.

FIG. 1 is a block diagram representation of an overall system in which a conference server utilizes location based priorities in accordance with an embodiment of the present invention. Endpoints 108a, 108b are in communication with a conference server 104. Endpoints 108a, 108b may be substantially any suitable system that is capable of transmitting and receiving media streams or signals. By way of example, endpoints 108a, 108b may be mobile devices such as push-to-talk devices, telephone devices, video phones, and/or computing devices. In general, at least one of endpoints 108a, 108b may include a policy manager, or be in communication with a policy manager, that may be used to specify a policy framework that relates to priorities associated with endpoints 108a, 108b.

Conference server 104 is arranged to obtain or otherwise receive media streams or signals received from endpoints 108a, 108b. A mixer 116 of conference server 104 is arranged to mix media streams obtained from endpoints 108a, 108b based on priorities embodied in prioritizing logic 120. Prioritizing logic 120 may include hardware logic and/or executable software logic embodied in a tangible media, and implements a policy framework which specifies priorities associated with streams received from locations associated with endpoints 108a, 108b.

In one embodiment, a priority location 112 may be identified within prioritizing logic 120 as having the highest mixing priority within an overall system. That is, media streams which originate from endpoints 108b associated with priority location 112 may be mixed by mixer 116 such that those media streams are mixed into an output stream with a higher priority than media streams received from endpoints 108a at other locations. Hence, if media streams are received by conference server 104 from an endpoint 108b in priority location 112 and from an endpoint 108*a*, the media stream received from endpoint 108*b* is mixed at a higher priority than the media stream received from endpoint 108*a*.

It should be appreciated that the priorities associated with streams originating at endpoints 108*a*, 108*b* are generally associated with the locations within which endpoints 108*a*, 108*b* are located, and not with endpoints 108*a*, 108*b* themselves. Hence, if an endpoint 108*b* moves out of priority location 112, streams originating from that endpoint 108*b* are not transmitted with a higher priority than streams originating from endpoints 108*a*. Alternatively, if an endpoint 108*a* moves into priority location 112, streams originating from that endpoint 108*a* may be transmitted at substantially the same priority as streams originating from endpoints 108*b* within priority location 112.

Priority location 112 may generally be any location, as for example a building or a geographical zone. A user, e.g., an administrator of a conference system or an administrator of a command center, may use substantially any interface to define priority location 112. Interfaces which may be used by a user to define a priority location such as ground zero include, but are not limited to, a telephony user interface (TUI) and a graphical user interface (GUI). A GUI may display a map such as a satellite map or a road map that may be used to define ground zero.

Figure 2A:
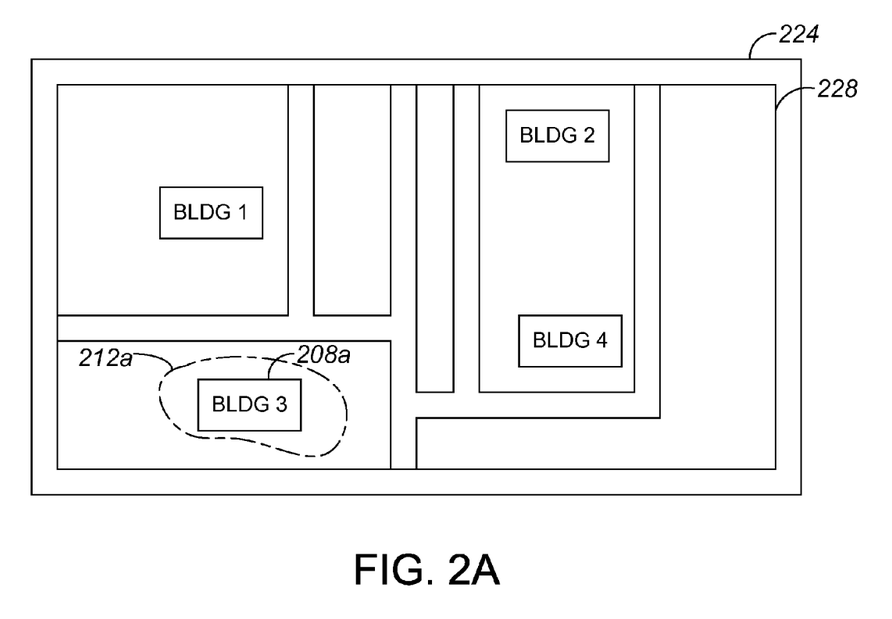
FIG. 2A is an example of an interface that allows a priority location to be selected.
Figure 2B:
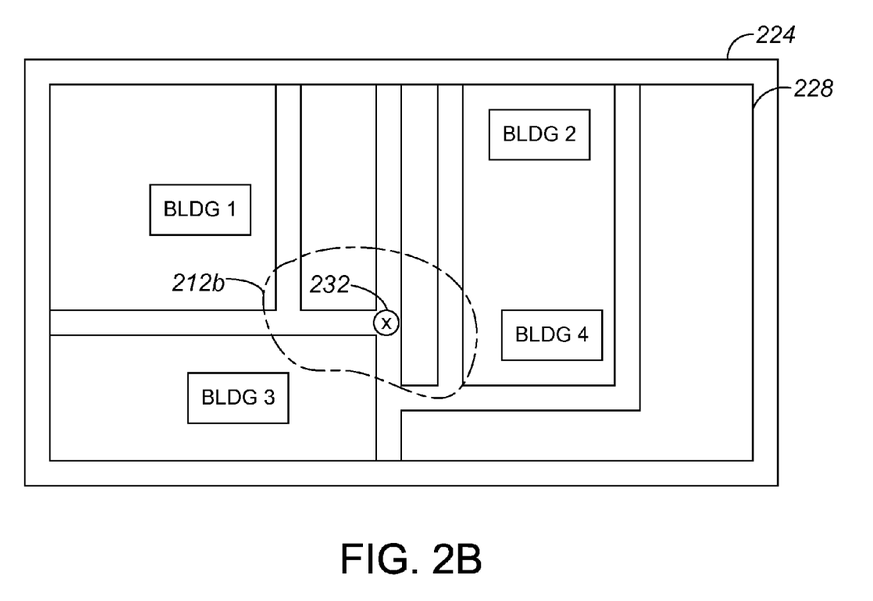
FIG. 2B is an example of an interface that allows a priority zone to be selected.

Referring next to FIGS. 2A and 2B, a GUI which may be used to identify a priority location or zone will be described in accordance with an embodiment of the present invention. With reference to FIG. 2A, the use of a GUI to select a priority location will be discussed. A GUI includes a display screen 224 on which a location map 228 is displayed. A user may select a building 208*a* as a priority location 212*a* in a variety of different manners. By way of example, to select building 208*a* as ground zero, a user may either highlight building 208*a* or highlight an area that includes building 208*a*. When building 208*a* is selected as priority location 212*a*, any endpoints (not shown) which are within building 208*a* or in close proximity to building 208*a* may be considered as being located at priority location 212*a*. Selecting building 208*a* as a relatively high-priority location 212*a* essentially includes defining other areas on location map 228 as being associated with relatively low-priority locations.

Rather than selecting a location such as building 208*a* as a priority location, a user may instead select a geographical zone as a priority location. As shown in FIG. 2B, a user may select a priority location 212*b* on location map 228 that encompasses a "pinpoint location" 232. Location 232 may be ground zero associated with a disaster or an accident, and priority location 212*b* may be a zone substantially immediately around location 232. A user may mark priority location 212*b* such that all endpoints (not shown) within priority location 212*b* are effectively included in priority location 212*b*. It should be appreciated that a location may be selected using a wide variety of different methods. Such methods may include, but are not limited to, selecting a building, a geographic zone, and/or a perimeter measured around a central point, e.g., a central point that is a person.

At a priority location, endpoints or conference participants may be assigned the highest mixing priorities within a conference system. In other words, streams received by a conference server from the active conference participants located at a priority location may be mixed at the same priority. Alternatively, a policy framework may be such that one active participant at a priority location is mixed at the highest priority while other active participants at the priority location are mixed at a slightly lower priority.

Figure 3:
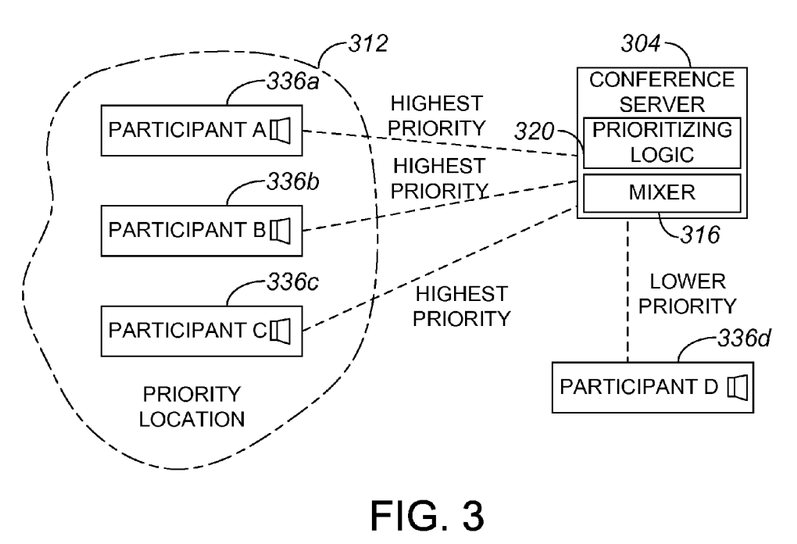
FIG. 3 is an example conference system in which participants at a priority location have the same priority.

With reference to FIG. 3, a conference system in which streams received by a conference server from participants at a priority location are mixed at the same priority will be described in accordance with an embodiment of the present invention. Active participants 336*a*-336*c* at a priority location 312 transmit media streams or signals to a conference server 304, and an active participant 336*d* that is at a location which is not priority location 312 also transmits a media stream or a signal to conference server 304. Prioritizing logic 320 within conference server 304 is arranged to prioritize media streams received from participants 336*a*-336*c* associated with priority location 312 over a media stream received from participant 336*d*. Hence, a mixer 316 within conference server 304 mixes and distributes streams such that media streams from participants 336*a*-336*c* at a relatively high volume while a media stream from participant 336*d* is mixed at a lower volume. That is, mixer 316 boosts media streams from participants 336*a*-336*c* to a high level and attenuates a media stream from participant 336*d* to a lower level such that a resulting output media stream reflects the levels of the streams.

Although prioritizing media streams from substantially all participants 336*a*-336*c* at priority location 312 over a media stream received from participant 336*d* may be effective in ensuring that information associated with priority location 312 is efficiently processed, mixing streams from participants 336*a*-336*c* at a relatively high volume may not be preferred in some instances. For example, in a situation in which people at priority location 312 may need to follow instructions of experts who are located in a variety of other locations, a system may be arranged such that a lower priority to assigned to users 336*a*-336*c* and, therefore, by default may increase the priority of media streams arriving from the experts who are located in a variety of different geographical locations. Hence, the priorities at which media streams from participants 336*a*-336*c* are mixed may vary, e.g., one participant 336*a*-336*c* may have a configurable mixing priority at any given time.

Figure 4A:
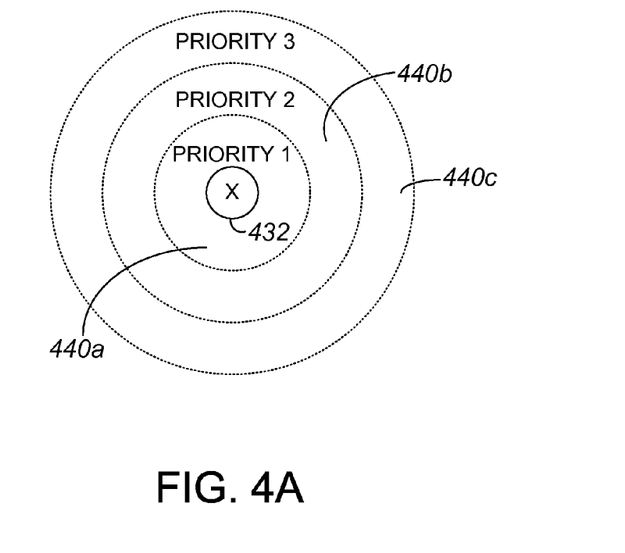
FIG. 4A is a representation of priorities in relation to a central priority location, e.g., ground zero.

In another example embodiment, a system may effectively divide locations into groups of locations. For example, a mixer may be programmed to provide a relatively high priority to at least one speaker from each location. Providing a limited number of speakers at each location with a relatively high priority would essentially ensure that a relatively broad perspective is represented such that no single location may dominate the discussion. Generally, media streams received from a priority location or a zone around ground zero may have the highest mixing priority within an overall system. Outside of the priority location or zone, the mixing priorities may be assigned based on a variety of different methods. For example, priorities may be assigned based on distances from ground zero. FIG. 4A is a representation of priorities in relation to ground zero. A zone 440*a* that substantially directly surrounds ground zero 432 may be associated with a first priority. Hence, endpoints or participants located within zone 440*a* may be mixed with the highest priority within a system. Endpoints or participants within a zone 440*b*, which is in proximity to zone 440*a*, may be mixed at a lower priority. Endpoints or participants within a zone 440*c*, which is in proximity to zone 440*b*, are mixed at an even lower priority. Hence, as the distance of an endpoint from ground zero 432 increases, the mixing priority for media streams or signals generated by the endpoint decreases. In one embodiment, priorities may be represented as a substantially continuous set of numbers rather than being classified into a finite number of priorities.

Figure 4B:
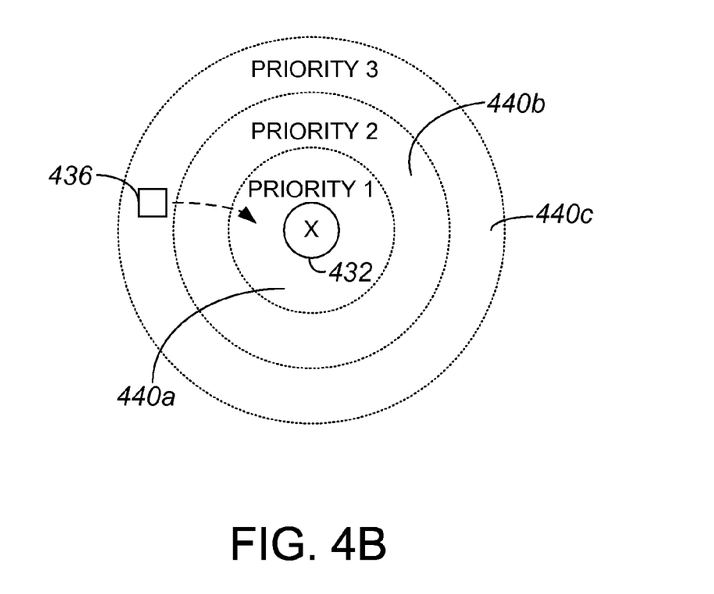
FIG. 4B is a representation of an endpoint or participant that has a priority associated with a relatively low priority location.
Figure 4C:
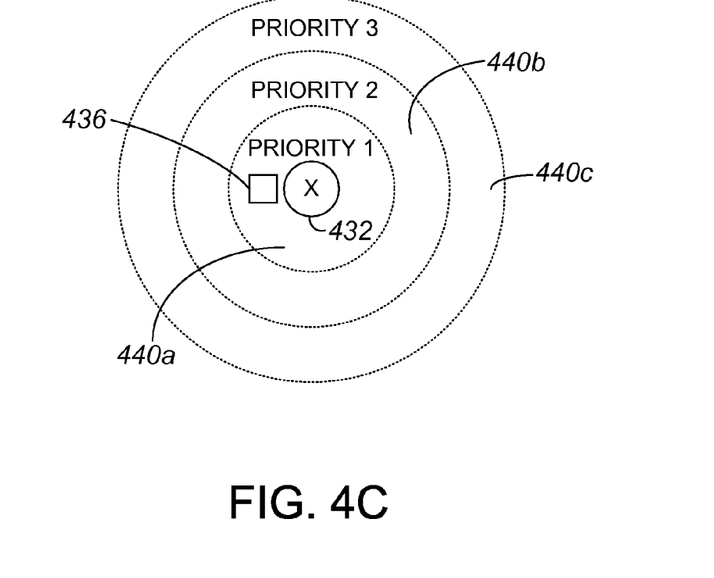
FIG. 4C is a representation of an endpoint, e.g., endpoint 436 of FIG. 4B, that has a priority associated with a high priority location.

As shown in FIG. 4B, when a participant 436 is located in zone 440*c*, participant 436 has a mixing priority that is associated with zone 440c. In the described embodiment, zone 440c is associated with a relatively low priority of "priority 3." Hence, media streams originating from participant 436 are generally processed as having a relatively low priority of "priority 3." If participant 436 moves into zone 440a as shown in FIG. 4C, then participant 436 effectively acquires a mixing priority that is associated with zone 440a. As zone 440a surrounds ground zero 432 and is associated with a high priority of "priority 1," streams originating from participant 436 may be processed as having the high priority of "priority 1."

Figure 5:
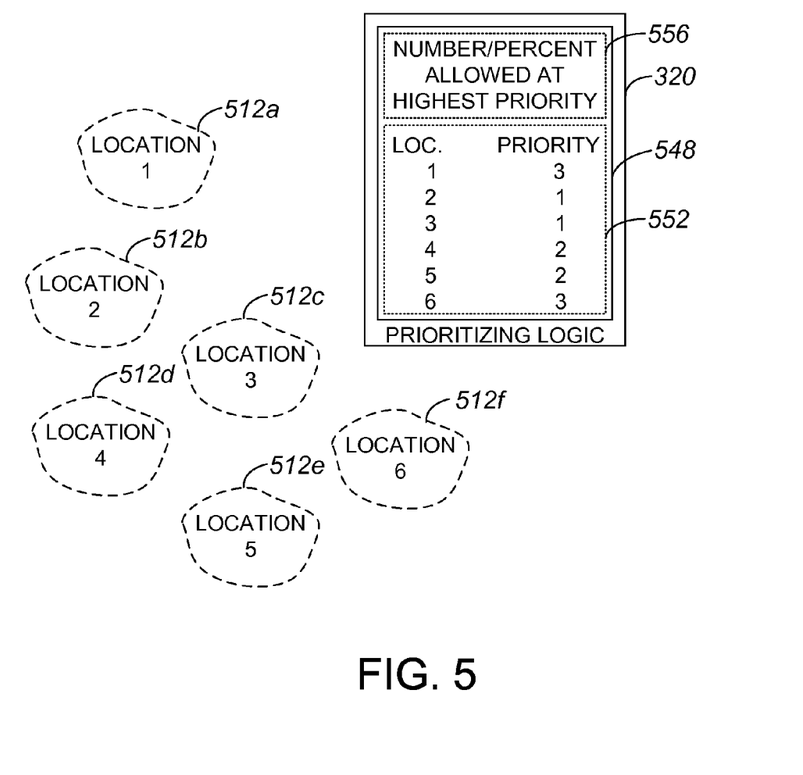
FIG. 5 is an example of a system in which a priority mixing policy is implemented.

When a policy framework is provided to a conference server, the policy framework may be implemented as prioritizing logic that effectively provides a mapping between locations and an associated priority. FIG. 5 is an example of a system in which a priority mixing policy is implemented in prioritizing logic. Prioritizing logic 320 may include a priority mixing policy 548 that has a mapping 552 and additional information 556. Mapping 552 maps or otherwise associates locations 512a-512f with specific priorities. By way of example, as shown, locations 512b, 512c may be specified as being associated with the highest mixing priorities such that media streams received from endpoints at locations 512b, 512c are mixed at higher volumes than streams received from other endpoints. In one embodiment, mapping 552 may also specify additional mixing priorities for individual endpoints or participants at locations 512a-512f. That is, mapping 552 may specify a number of participants at a given location 512a-512f which may be mixed at the priority assigned to that location 512a-512f.

As mentioned above, priority mixing policy 548 also includes additional information 556. Additional information 556 may include, for example, information relating to a number of locations that may be associated with a highest mixing priority. The number of locations allowed at the highest mixing priority may be expressed as an approximately maximum percentage of media streams that may be mixed at a high volume. In one embodiment, if the approximately maximum percentage of streams that may be mixed at a high volume is not reached by media streams associated with locations 512b, 512c, priority mixing policy 548 may specify that media streams associated with other locations 512a-512f may be mixed at the high volume based on their respective priorities.

It should be appreciated that mixing priorities of locations 512a-512f that are not assigned the highest priority may effectively be boosted in the event that the locations with the highest mixing priorities are not active, e.g., if there are currently no active endpoints or participants associated with the highest priority locations. That is, priority mixing policy 548 may specify that the effective highest mixing priority is associated with the highest priority location specified in mapping 552 that has an active endpoint or participant. In one embodiment, if locations 512b, 512c do not include any active endpoints or participants, media streams originating from active endpoints in locations 512d, 512e may be mixed at relatively high volumes because locations 512d, 512e have the highest relative priorities of locations 512a-512f which currently have active endpoints.

Figure 6:
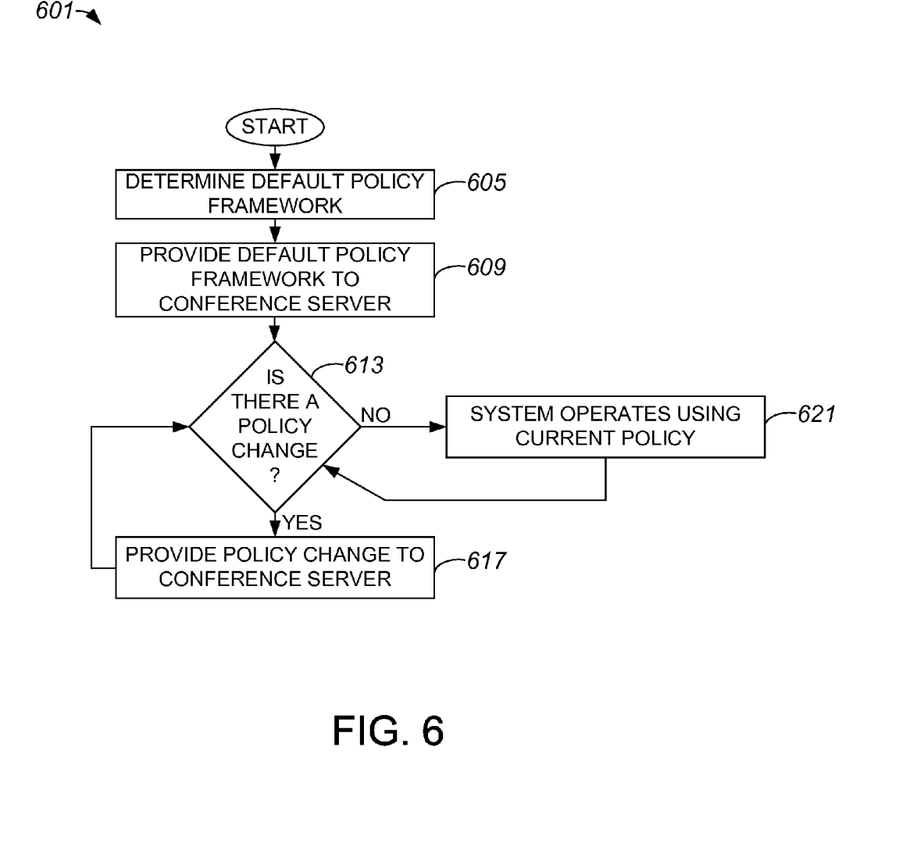
FIG. 6 is a process flow diagram which illustrates a method of providing policy information to a conference server.

FIG. 6 is a process flow diagram which illustrates a method of providing a conference server with information relating to a policy framework. A process 601 of providing information to a conference server begins at step 605 in which a default policy framework is determined. The default policy framework may be determined by a policy manager or a command center. After the default policy framework is determined, the default policy framework is provided by the policy manager to a conference server in step 609. Providing the default policy framework to a conference server may include encoding the policy framework in logic that is accessible to a mixer of the conference server.

Once the default policy framework is provided to a conference server, the conference server may generally implement the default policy framework. In step 613, the policy manager determines if there is a policy change. A policy change may be in order, for example, if there is an accident or a disaster that results in a new location becoming a priority location. A new disaster site, e.g., ground zero, may be granted a higher priority via either a temporary or permanent policy change. That is, the mixing priority associated with endpoints at the new disaster site may be temporarily boosted to a higher level, as for example until the issues at the new disaster site are resolved, or may be permanently boosted.

If the determination in step 613 is that there is a policy change, the policy manager provides information relating to the policy change to the conference server in step 617. It should be appreciated that the policy change may either be a change to a new policy framework, or a change back to a default policy framework. After the policy change is provided to the conference server, process flow returns to step 613 in which the policy manager determines if there is another policy change. Alternatively, if it is determined in step 613 that there is no policy change, the overall system operates using the current policy in step 621. Process flow then returns to step 613 in which the policy manager determines if there is a policy change.

Figure 7:
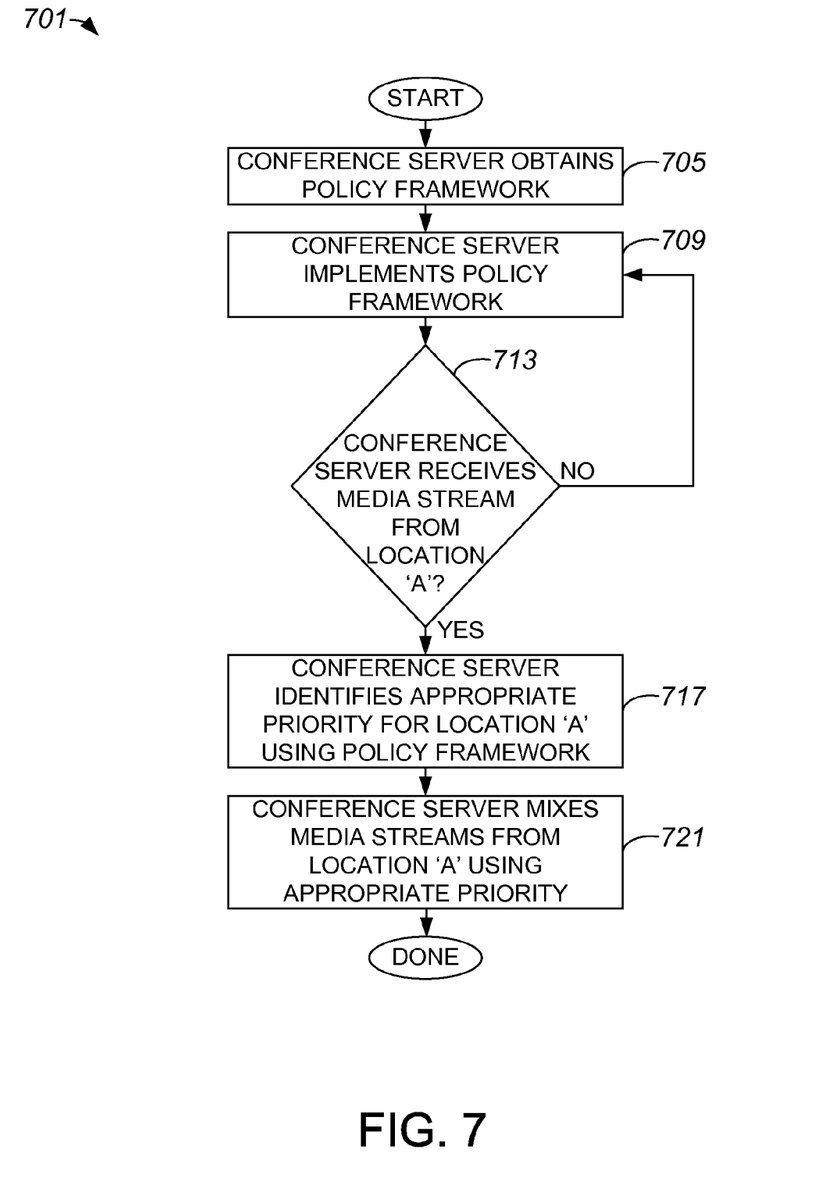
FIG. 7 is a process flow diagram which illustrates a method of operating a conference server which utilizes a policy framework that provides mixing priorities based on location.

A conference server implements the policy framework provided by a policy manager or a command center. With reference to FIG. 7, one method of utilizing a policy framework to mix signals based on location priorities will be described in accordance with an embodiment of the present invention. A process 701 of utilizing a policy framework begins at step 705 in which a conference server obtains a policy framework. The policy framework may be obtained from, e.g., received from, an administrator of the conference server, or an owner of a conference. Once the conference server obtains the policy framework, the conference server implements the policy framework in step 709. Implementing a policy framework may involve providing logic that may be used by a mixer to mix media streams or signals received from speakers. In one embodiment, implementing a policy framework may include processing any updates to the policy framework that may be obtained by the conference server.

In step 713, the conference server determines if it has received a media stream from location 'A'. That is, it is determined whether there is a media stream that is to be mixed. If the determination is that a signal has not been received from location 'A', then process flow returns to step 709 in which the conference server implements the policy framework. Alternatively, if it is determined that a media stream has been received from location 'A', the conference server identifies the appropriate priority to use for mixing the media stream in step 717. The appropriate priority may be identified using priorities specified within the policy framework.

After the conference server identifies an appropriate priority for location 'A', the conference server uses the priority in step 721 to mix media streams received from location 'A'. For example, if location 'A' is a highest priority location identified in the policy framework, the media stream may be mixed into a conference at the highest priority. Once the media streams received from location 'A' are mixed based on the appropriate priority, and subsequently distributed, the process of utilizing a policy framework is completed.

Although only a few embodiments of the present invention have been described, it should be understood that the present invention may be embodied in many other specific forms without departing from the spirit or the scope of the present invention. By way of example, while endpoints or participants present at locations which have a relatively low mixing priority have been described as effectively being processed at a low priority, streams which originate from such endpoints may not necessarily be processed at a low priority. In other words, while a stream that originates from an endpoint located in a low priority location may be mixed at a low priority when there are streams that originate from endpoints located in higher priority locations, such a stream may be mixed at a relatively high priority if there are no streams that originate from endpoints located in higher priority locations.

Location based priorities may be used in the context of filtering such that a location is used to identify the type of filtering to apply to a given media stream. That is, an overall filtering policy framework may be location based. In one embodiment, a filter that is appropriate for filtering conversational noise may be applied at a building location while a filter that is appropriate for filtering wind noise may be applied at an outdoor location. The specification of a filtering policy framework may be made in prioritizing logic associated with a conference server.

A policy framework may include a variety of different policies that may be implemented at different times. Generally, a policy framework may have either a static configuration or a dynamic configuration. A policy framework that includes different policies may be substantially static if different policies are effectively present to be implemented at specific times. For example, a policy framework may be such that a particular location has a relatively low priority at a particular time of day, and the highest possible priority at a different time of day. Alternatively, a policy framework that includes different policies may have a substantially dynamic configuration if a user is expected to select from amongst different policies at any given time.

While a conference system may be arranged to weight a priority location, e.g., a disaster area, at approximately one hundred percent such that substantially only media streams from the priority location are mixed into an output signal while media streams from other locations are effectively dropped, a conference system may also be arranged to weight the priority location at less than approximately one hundred percent. For instance, a mixer may be arranged to select from amongst current speakers such that a predetermined percentage of media streams that are mixed into an output signal are from a priority location, while the balance of the media streams that are mixed are associated with the loudest current speakers that are not from the priority location.

Mixing priorities for participants or speakers at a given location have been described as being such that all active participants at the given location are assigned the highest mixing priority, or being such that one active participant at the given location is assigned the highest mixing priority. The assignment of a highest mixing priority is not limited, however, to one or all active participants having the highest mixing priority. In one embodiment, assigning a higher mixing priority to a given location may include specifying a highest mixing priority for any fixed number of active or current speakers at the given location.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. Logic encoded in one or more tangible, non-transitory computer-readable media for execution and when executed operable to:
   identify at least a first location of a plurality of locations, the plurality of locations being associated with a conference system, the conference system having a conference server and a mixer;
   prioritize the plurality of locations by assigning a first priority to at least the first location and assigning a second priority to a second location of the plurality of locations, wherein the second priority is lower than the first priority, wherein the logic operable to prioritize the plurality of locations is further operable to assign the first priority to the endpoints associated with the first location;
   receive a first media stream from a first endpoint associated with the first location;
   receive a second media stream from a second endpoint associated with the second location; and
   process received media streams such that media streams received from endpoints associated with the first location as having a higher priority than media streams received from endpoints associated with the second location, wherein the logic operable to process the received media streams is further operable to boost the first media stream to a high level and to boost the second media stream to a low level, wherein the endpoints associated with the first location each has a first location-specific filter and the endpoints associated with the second location each has a second location-specific filter, and the logic operable to process the received media streams is further operable to process the media streams received from endpoints associated with the first location using the first location-specific filter and to process the media streams received from endpoints associated with the second location using the second location-specific filter.

2. An apparatus comprising:
   a prioritizer, the prioritizer being arranged to identify at least a first location and a second location, the prioritizer further being arranged to identify a first mixing priority for the first location and a second mixing priority for the second location, wherein the first location has at least a first associated endpoint and the second location has at least a second associated endpoint, the first mixing priority being higher than the second mixing priority; and
   a mixer, the mixer being arranged to mix a first stream obtained from at least the first associated endpoint using the first mixing priority and to mix a second stream obtained from the second associated endpoint using the second mixing priority, wherein the mixer is further arranged to mix the first stream into an output stream at a higher volume than the second stream.

3. The apparatus of claim 2 wherein the prioritizer is arranged to receive an update, the update being arranged to identify the first location as a priority location and to specify the first mixing priority.

4. The apparatus of claim 2 wherein the prioritizer is further arranged to identify a percentage of streams that comprise an overall output stream which may be of the first mixing priority.

5. The apparatus of claim 2 wherein the first location has a plurality of associated endpoints, the prioritizer being arranged to assign the first mixing priority to each endpoint of the plurality of associated endpoints.

6. The apparatus of claim 2 wherein the prioritizer is further arranged to assign a first filter to the first location and to assign a second filter to the second location.

7. The apparatus of claim 6 wherein the first filter is arranged to process the first stream and the second filter is arranged to process the second stream, wherein if the first associated endpoint is altered to be associated with the second location, the second filter is arranged to process the first stream.

\* \* \* \* \*